United States Patent
Huang et al.

(10) Patent No.: US 6,332,273 B1
(45) Date of Patent: Dec. 25, 2001

(54) METHOD FOR MAKING A CATALYTIC CONVERTER ASSEMBLY

(75) Inventors: Hsin-Hong Huang, West Bloomfield; Kenneth Mark Pickett, Monroe; Gary Meyers, Farmington, all of MI (US)

(73) Assignee: Visteon Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/524,737

(22) Filed: Mar. 13, 2000

(51) Int. Cl.[7] ....................................... B23P 15/00
(52) U.S. Cl. .................................. 29/890; 29/446
(58) Field of Search ............................ 29/890, 446, 428; 422/171, 172, 211

(56) References Cited

U.S. PATENT DOCUMENTS

| | | |
|---|---|---|
| 2,222,762 | 11/1940 | Debor et al. . |
| 3,335,590 | 8/1967 | Early . |
| 3,978,567 | 9/1976 | Vroman . |
| 4,207,661 | 6/1980 | Mase et al. . |
| 4,360,957 | 11/1982 | Eng . |
| 4,413,392 | * 11/1983 | Otani et al. ............................ 29/446 |
| 4,519,120 | * 5/1985 | Nonnenmann et al. . |
| 4,969,264 | 11/1990 | Dryer et al. . |
| 5,329,698 | * 7/1994 | Abbott .................................. 29/890 |
| 5,385,873 | 1/1995 | MacNeill . |
| 5,557,847 | * 9/1996 | Koshiba ................................ 29/890 |
| 5,604,980 | * 2/1997 | Shustorovich et al. ............... 29/890 |
| 5,701,737 | 12/1997 | Branik et al. . |
| 5,724,735 | * 3/1998 | Ickes et al. .......................... 422/171 |
| 5,729,902 | * 3/1998 | Wieres et al. ......................... 29/890 |
| 5,752,317 | 5/1998 | Keating et al. . |
| 5,953,817 | 9/1999 | Watanabe et al. . |
| 6,000,131 | * 12/1999 | Schmitt ................................. 29/890 |

* cited by examiner

Primary Examiner—I Cuda-Rosenbaum
(74) Attorney, Agent, or Firm—Visteon Global Tech., Inc.

(57) ABSTRACT

A method 30 for making a relatively low profile catalytic converter assembly 10 which is selectively deployed upon a vehicle 14. The catalytic converter assembly 10 is formed from a generally hollow tube or member 34 which is selectively expanded within a die 31. The expanded member 34 receives a pair of catalytic substrate members 54, 56, thereby forming a low profile catalytic converter assembly 10.

14 Claims, 3 Drawing Sheets

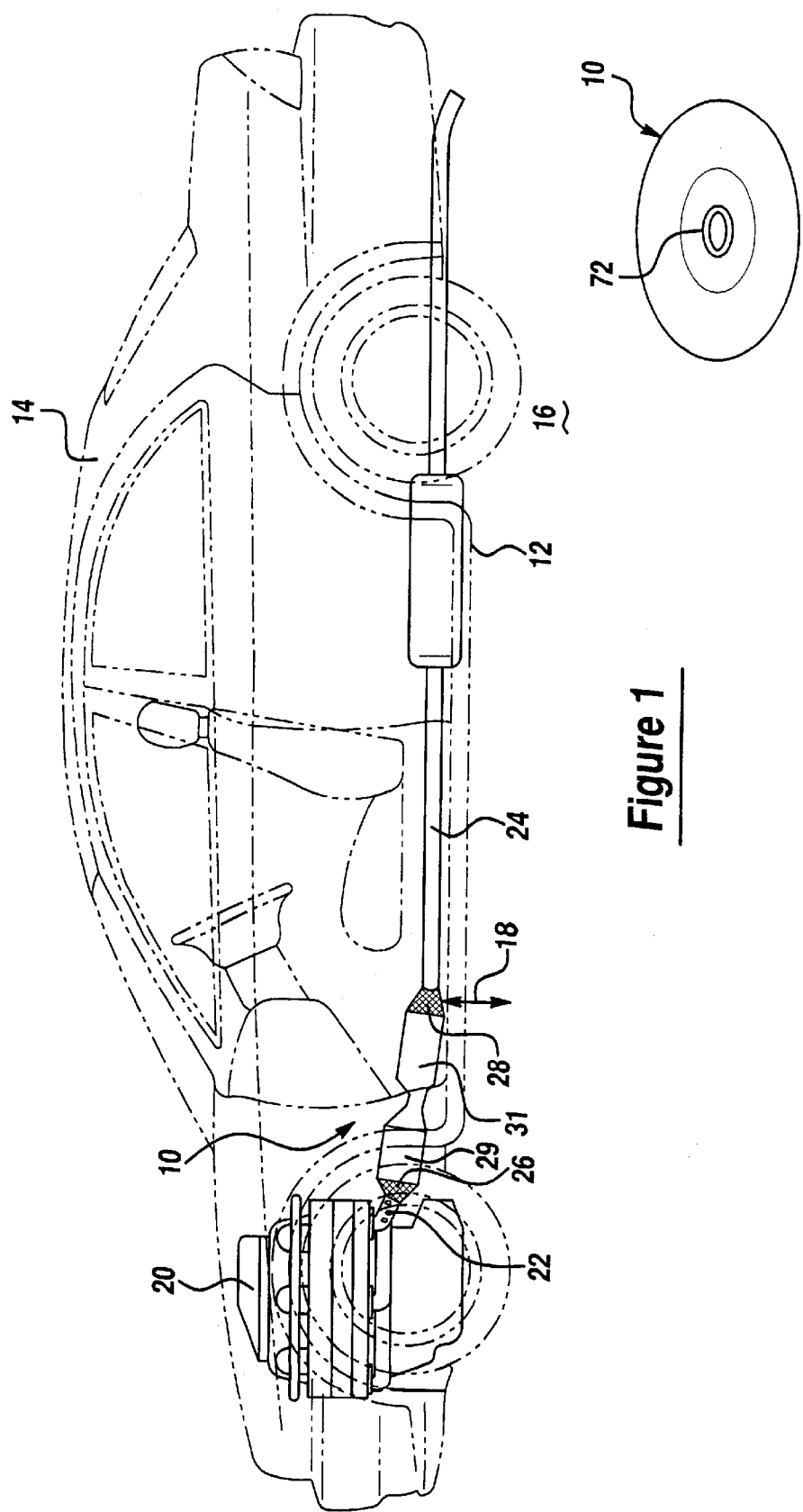

METHOD FOR MAKING A CATALYTIC CONVERTER ASSEMBLY

FIELD OF THE INVENTION

This invention relates to a catalytic converter assembly and more particularly, to a catalytic converter assembly which is adapted to be selectively deployed upon a vehicle and to receive and treat undesirable emissions emanating from a vehicle engine.

BACKGROUND OF THE INVENTION

A catalytic converter assembly is typically deployed upon a vehicle and is communicatively and physically coupled to the engine, effective to receive and to treat the undesirable engine emissions. The treated emissions are then output from the assembly and communicated to the vehicle's exhaust assembly where they are output into the ambient environment in which the vehicle resides. More particularly, the catalytic converter assembly usually resides upon the bottom surface of the vehicle. Since the catalytic converter assembly resides upon the bottom surface of the vehicle (i.e., the surface of the vehicle which is in close proximity and slightly above the road upon which the vehicle travels), it is highly desirable to form the catalytic converter into an oval or relatively thin or low profile shape or geometric configuration in order to ensure that adequate clearance exists between the catalytic converter and the road.

While prior catalytic converter assemblies adequately treat the undesirable engine emissions, they are difficult to manufacture, requiring the selective formation and attachment of many separate and individual portions or members, thereby undesirably increasing the overall vehicle cost and undesirably increasing the likelihood that some of these individual members or portions become or are defective or "out of tolerance", thereby preventing the overall catalytic converter assembly from properly fitting beneath the vehicle and from properly operating.

Some attempts have been made to simplify the manufacture or formation of a catalytic converter assembly, such as by the use of a single tube or member which has a relatively large diameter. The relatively large diameter tube or member is selectively reduced or made thinner by a "drawing" or "spinning" process. While this process does produce a catalytic converter assembly which selectively treats undesirable engine emissions, it does not allow a substantially low profile or oval shaped member to be practically produced, thereby undesirably causing the deployed catalytic converter assembly to be in relatively close proximity to the road surface and concomitantly increasing the likelihood of damage to the converter by stones or other debris or objects which are resident upon the road. In order to improve the "road clearance", the catalytic converter must by mounted relatively "high" within the vehicle, thereby undesirably reducing the amount of mounting space necessary for the other vehicle components. The mounting space requirements of these other vehicle components may even make this alternative catalytic converter mounting arrangement substantially unavailable or unattainable.

Further, the drawing or reduction of the provided member or tube detrimentally impacts or substantially reduces the structural integrity of the tube, thereby increasing the likelihood of failure or malfunction of the catalytic converter assembly.

There is therefore a need for a new and improved method for making a catalytic converter assembly which allows a substantially low profile or oval/elliptically shaped catalytic converter assembly to be produced from a single tubular member and in a manner which overcomes at least some of the previously delineated drawbacks of prior techniques or methodologies for making catalytic converter assemblies.

SUMMARY OF THE INVENTION

It is a first object of the present invention to provide a method or process for producing a catalytic converter assembly which overcomes some or all of the previously delineated drawbacks of prior catalytic converter production methods and processes.

It is a second object of the present invention to provide a method or process for producing a catalytic converter assembly which overcomes some or all of the previously delineated drawbacks of prior catalytic converter production methods and processes and which allows for the selective formation of a catalytic converter assembly by use of a single member which is selectively expanded.

It is a third object of the present invention to provide a method or process for producing a catalytic converter assembly which overcomes some or all of the previously delineated drawbacks of prior catalytic converter production methods and processes and which allows for the selective formation of a relatively low profile catalytic converter assembly for use upon a vehicle.

According to a first aspect of the invention, a method for making a catalytic converter assembly is provided. The method includes the steps of obtaining a member; selectively expanding a first and a second portion of the obtained member; and placing catalytic substrates within each of the selectively expanded first and second portions of the obtained member.

These and other features, aspects, and advantages of the present invention will become apparent from a reading of the following detailed description of the preferred embodiment of the invention and by reference to the following drawings.

BRIEF DESCRIPTION OF THE DRAWINGS

FIG. 1 is a side view of a vehicle having a catalytic converter assembly which is made in accordance with the teachings of the preferred embodiment of the invention;

FIG. 3 is a view of the catalytic converter assembly which is made in accordance with the process shown in FIGS. 2(a)–(f) and which is along view line 3—3.

DETAILED DESCRIPTION OF THE PREFERRED EMBODIMENT OF THE INVENTION

Figure 2A:
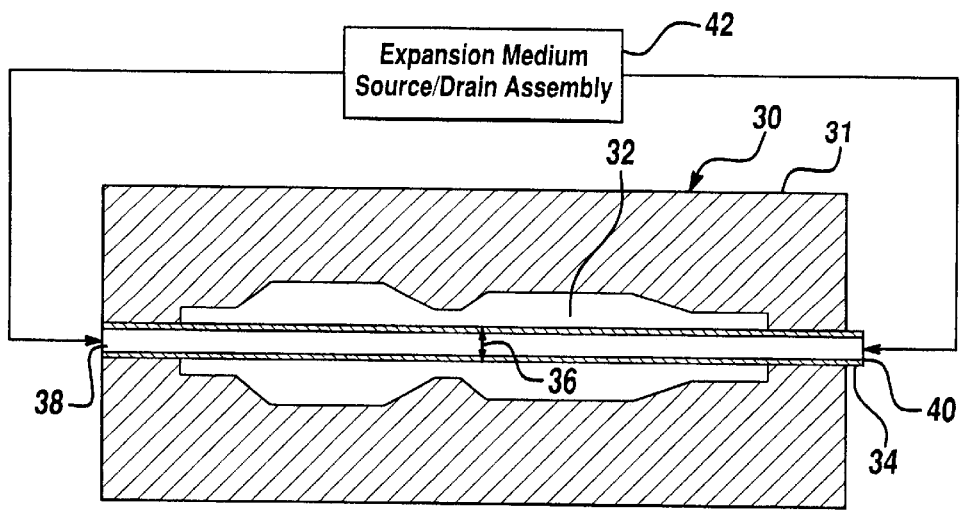
FIGS. 2(a)–2(f) are successive diagrammatic views of the catalytic converter formation process according to the teachings of the preferred embodiment of the invention.

Referring now to FIG. 1, there is shown a low profile catalytic converter assembly 10 which is made in accordance with the teachings of the preferred embodiment of the invention and which is operatively deployed and secured to the bottom or under surface 12 of a vehicle 14 and which is separated from the road 16 by a relatively large separation or clearance distance 18. As further shown best in FIG. 1, assembly 10 is operatively coupled to and/or attached to the engine 20 and receives the undesirable engine emissions 22. The assembly 10 is further operatively coupled to the exhaust assembly 24. The received undesirable emissions 22 are chemically treated by the contained substrate portions 26, 28 and the "treated" emissions are communicated to the exhaust assembly 24 were they are communicated to the ambient environment in which the vehicle resides.

Referring now to FIGS. 2(a)–(g), there is shown a process 30 for making the low-profile catalytic converter assembly 10. Particularly, process 30 begins with the step which is shown in FIG. 2(a) and which requires the acquisition of a die 31 which has an interior cavity 32 which conforms to the general shape of the catalytic converter assembly 10. Further, a generally tubular and hollow member 34 having a relatively constant diameter 36 is insertably placed within the cavity 32 and is substantially and longitudinally coextensive to the cavity 32. Each opposed open end 38, 40 of the tube 34 is communicatively and physically coupled to the expansion medium source and drain assembly 42.

Figure 2B:
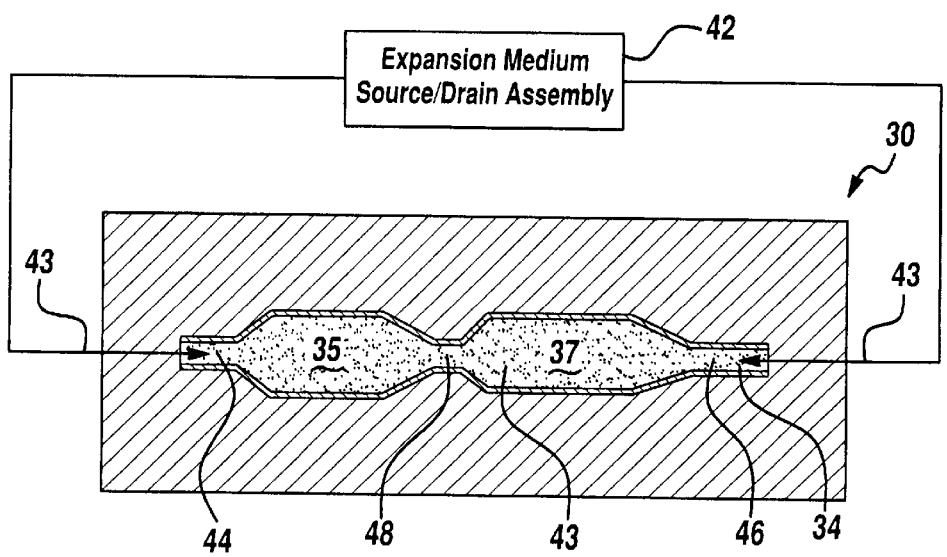

In the second step of process 30, which is best shown in FIG. 2(b), the medium or material 43 which is contained within the assembly 42 is communicated into the tube 34 through the open ends 38, 40, thereby causing the tube 34 to expand and to substantially fill the cavity 32, effective to cause the tube or member 34 to be formed into the shape and geometric configuration of the assembly 10. In one non-limiting embodiment, the expansion medium comprises air. In a further non-limiting embodiment, the expansion medium 43 comprises water or some other type of relatively non-viscous liquid material. Hence, tube 34 forms two substantially identical and selectively expanded regions or portions 35, 37. Substantially identical distal or end portions 44 and 46 and throat or middle portion 48 have a substantially identical and respective diameter which is substantially and respectively equal to the diameter 36 and is "unchanged" during the formation process.

Figure 2C:
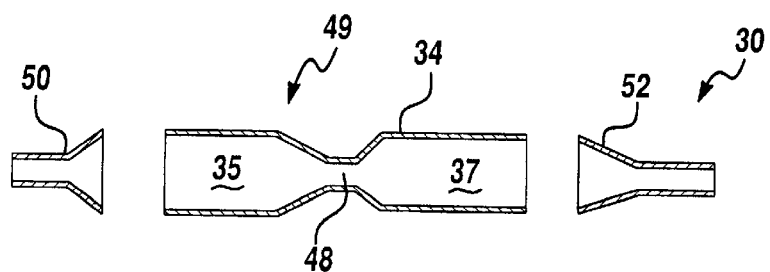

In the third step of process 30, which is shown best in FIG. 2(c), the medium 43 is drained or communicated into the assembly 42, the die 31 is opened, and the formed tube 34 is removed from the open die 31. Substantially identical end portions 50, 52 respectively comprising end portion 44 and a portion of the region 35, and end portion 46 and a portion of the region 37, are then removed from the formed tube 34, thereby forming a central member 49. In one non-limiting embodiment, end portions 50, 52 are removed by use of a laser cutting device, although other cutting devices may be employed.

Figure 2D:
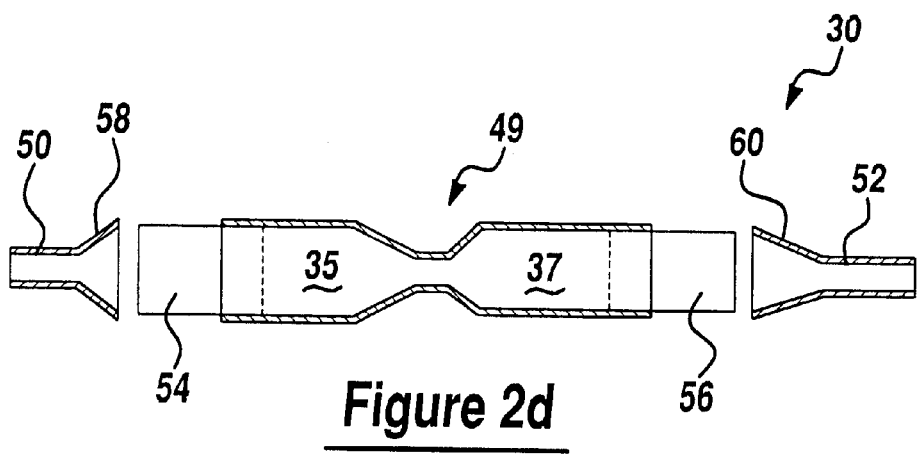

In the fourth step of process 30, which is shown best in FIG. 2(d), substantially identical catalytic substrate members or "catalysts" 54, 56 are respectively, frictionally, and insertably placed into remaining portions 35 and 37 resident within the central member 49.

Figure 2E:
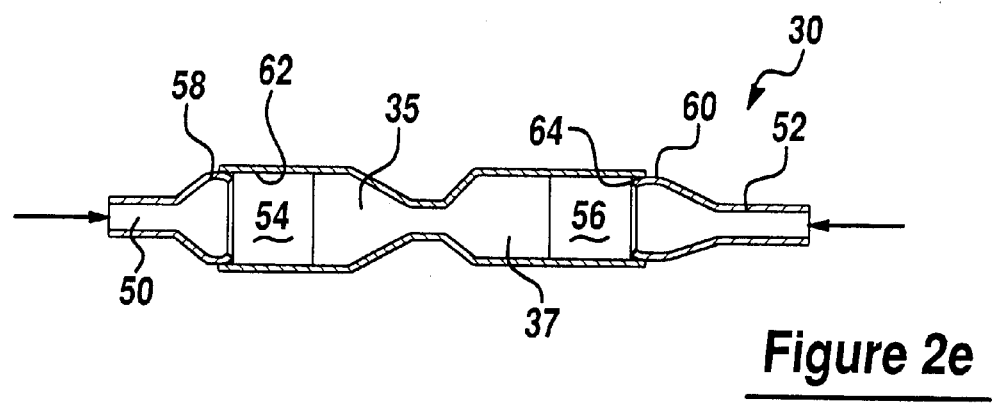

In the fifth step of process 30, which is shown best in FIG. 2(e), end portions 50, 52 are selectively attached to the central member 49, thereby respectively securing members 54, 56 within the central member 49 and "reforming" the member 34, thereby selectively securing the catalytic substrate members 54, 56 within the "reformed" member 34. Particularly, in this fifth process step, respective outer edges 58, 60 of members 50, 52 are bent or "swaged" and engage the respective undersurface edge 62, 64 of the portions 35, 37 of the central member 49. These pairs of edges 58, 62; and 60, 64 are respectively welded or otherwise secured in a conventional fashion, thereby creating a catalytic converter assembly 10 having a relatively low profile and a substantially elliptical or oval cross sectional area 72, as shown best in FIG. 3.

Figure 2F:
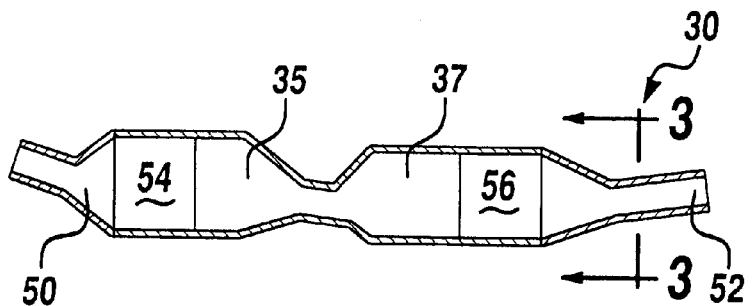

In the sixth step of process 30, which is shown best in FIG. 2(f), attached end portions 50, 52 are selectively bent or otherwise shaped in a desired manner for deployment upon the vehicle 12.

It is to be understood that the invention is not limited to the exact construction or method which has been previously delineated above, but that various changes and modifications may be made without departing from the spirit and the scope of the invention as set forth in the following claims.

What is claimed is:

1. A method for making a catalytic converter assembly, said method comprising the steps of:
   providing a member;
   selectively expanding a first and a second portion of said member; and
   selectively placing a catalytic substrate member within each of said selectively expanded first and second portions of said member, thereby forming a catalytic converter assembly.

2. The method of claim 1 wherein said step of selectively expanding said first and second portions comprises the steps of:
   providing a source of a certain medium;
   providing a die;
   placing said member within said die;
   communicatively coupling said source of said certain medium to said member, thereby causing said member to selective expand within said die.

3. The method of claim 2 wherein said step of selectively placing a catalytic substrate member within each of said expanded first and second portions comprises the steps of:
   removing said first and second portions from said selectively expanded member;
   placing a first catalytic substrate member within said first portion;
   placing a second catalytic substrate member within said second portion; and
   selectively reattaching said first and second portions to said selectively expanded member.

4. The method of claim 1 wherein said catalytic converter assembly has a substantially elliptical shaped cross sectional area.

5. The method of claim 1 wherein said catalytic converter assembly has a low profile.

6. The method of claim 2 wherein said medium comprises liquid.

7. The method of claim 2 wherein said medium comprises gas.

8. The method of claim 3 wherein the selective removal of said first and second end portions from said selectively expanded member is performed by the use of a laser cutting device.

9. A method for making a catalytic converter assembly, said method comprising:
   providing a first substantially tubular member having a certain diameter;
   providing a die having a cavity of a certain desired low profile shape;
   placing said substantially tubular member within said cavity;
   providing a certain medium;
   filling said substantially tubular member with said medium, effective to cause said substantially tubular member to expand within said cavity and causing said expanded substantially tubular member to be formed into said certain desired low profile shape having a first expanded portion, a second expanded portion which is substantially identical to said first expanded portion, and a middle portion having a second diameter which is substantially equal to said certain diameter;

draining said medium from said selectively expanded member;

removing said expanded substantially tubular member from said die;

selectively removing a first end portion;

selectively removing a second end portion;

providing a first and second catalytic substrate members;

placing said first catalytic substrate member within said first expanded portion;

placing said second catalytic substrate member within said second expanded portion;

selectively attaching said removed first end portion to said first expanded portion;

selectively attaching said removed second end portion to said second expanded portion; and selectively bending said first and second end portions, thereby forming a catalytic converter assembly.

10. The method of claim 9 wherein said medium comprises water.

11. The method of claim 9 wherein said medium comprises air.

12. The method of claim 9 further comprising the step of:

selectively attaching said formed catalytic converter assembly to a vehicle.

13. The method of claim 9 wherein the steps of selectively removing said first and second end portions comprises utilizing a laser cutting device to selectively remove said first and second end portions.

14. The method of claim 9 wherein said catalytic converter assembly has a substantially elliptical shape.

* * * * *